United States Patent [19]

Wooler et al.

[11] 4,024,310

[45] May 17, 1977

[54] LAMINATES

[75] Inventors: Alan Metcalf Wooler; Dennis Charlton Allport, both of Manchester, England

[73] Assignee: Imperial Chemical Industries Limited, London, England

[22] Filed: Aug. 18, 1975

[21] Appl. No.: 605,505

[30] Foreign Application Priority Data

Oct. 8, 1974 United Kingdom ............ 43511/74

[52] U.S. Cl. .............................. 428/313; 428/310; 428/425; 428/913; 428/921; 260/2.5 AW

[51] Int. Cl.$^2$ ............................................ B32B 5/20

[58] Field of Search ............ 260/2.5 AW; 428/310, 428/313, 314, 315, 425, 920, 921, 913

[56] References Cited

UNITED STATES PATENTS

| | | | |
|---|---|---|---|
| 3,068,043 | 12/1962 | Komenda | 428/313 |
| 3,466,222 | 9/1969 | Curtis | 428/313 |
| 3,644,168 | 2/1972 | Bonk et al. | 428/315 |
| 3,647,608 | 3/1972 | Enlow et al. | 428/313 |
| 3,814,659 | 6/1974 | Nadeau | 428/313 |
| 3,903,346 | 9/1975 | De Leon et al. | 428/313 |
| 3,934,066 | 1/1976 | Murch | 428/321 |

*Primary Examiner*—William J. Van Balen
*Attorney, Agent, or Firm*—Cushman, Darby & Cushman

[57] ABSTRACT

A laminated panel having improved fire resistance comprising a core of rigid isocyanurate based foam sandwiched between two facing sheets, characterized in that at least one of the facing sheets has an adherent layer of intumescent material applied to its inner surface; the whole being bonded together by the foam core into a unitary construction.

In a further embodiment of the invention there is embedded within the foam core a binding material.

8 Claims, No Drawings

LAMINATES

The present invention relates to improvements in or relating to laminates, and more particularly to laminates having a core or rigid synthetic foam.

Laminated rigid form panels are widely used in the building industry as sound and thermal insulating materials and as non-load bearing structual members. It is however important that building materials do not readily burn and propagate fire through a building. It is already known that isocyanurate based foams have excellent high temperature and fire resistant properties in comparison with other polyurethane foams, but under certain conditions it has been observed that whilst the foam itself is extremely resistant to burning, deep cracks often develop through which flames can penetrate and heat is conducted, thus leading to premature failure of the foam panel.

It has now been found that if a layer of intumescent material is interposed between the foam core and one or both facing sheets the fire resistance of the laminate is improved. It has also been found that further improvement is obtained if, in addition, a binding material is embedded in the foam core, which tends to moderate the cracking of the foam.

Thus according to the present invention, there is provided a laminated panel comprising a core of rigid isocyanurate based foam sandwiched between two facing sheets, characterised in that at least one of the facing sheets has an adherent layer of intumescent material applied to its inner surface; the whole being bonded together by the foam core into a unitary construction.

As a further feature of our invention there is also provided a laminated panel comprising a core of rigid isocyanurate based foam, sandwiched between two facing sheets, characterised in that at least one of the facing sheets has an adherent layer of intumescent material applied to its inner surface and in that there is embedded within the form core a binding material; the whole being bonded together by the foam core into a unitary construction.

The invention also includes methods for making the laminates of the invention.

Rigid isocyanurate based foams to which the invention relates are rigid polymeric foams characterised by the presence therein of an isocyanurate ring structure. The formulation of such foams has already been described in the prior art. They are conventionally made by reacting, in the presence of a blowing agent and a catalyst capable of polymerising isocyanate groups to isocyanurate structures, an excess of an organic polyisocyanate with a polymeric polyol. Additives such as surfactants, plasticisers, stabilisers, fillers and pigments may also be included in the foam ingredients.

The facing sheets may be made of any material to which the intumescent material will adhere. Suitable materials include, for example wood, paper, cardboard, metal, asbestos, plasterboard and fibre glass or fibre glass/polyester mixtures. If only one facing sheet is to be coated with a sodium silicate layer, then the non-coated sheet may be made of any other material which is capable of adhering to the foam core in the gelled, partly cured state. Such materials include rubber and plastic materials, for example polyvinyl chloride and acrylonitrile/butadiene/styrene copolymer. The fire resistance of the laminate as a whole will however be further improved if non-combustible facing sheets are used, and hence the preferred laminate has at least one facing sheet made of sheet metal, metal foil, asbestos, asbestos cement or plasterboard. The outer surface of the facing sheets can be smooth or embossed or indented to provide functional or decorative effects.

Intumescent materials are those which swell when heated due to the formation of water vapour or pyrolysis gases within the material. They may be non-combustible and form a heat insulating layer and absorb heat through evaporating water. In the present invention they are able to swell and plug the cracks which develop in the foam core when the laminate is subjected to high temperatures.

Intumescent materials which may be used in the invention include intumescent paints for example, emulsion paints containing an intumescing agent such as a borate or phosphate and a binding agent such as casein. It has been found convenient however, to use water soluble silicates which are commercially available in various grades and are relatively inexpensive.

The preferred silicates are the materials generally known as water-glasses which are sodium silicates of the general formula:

$$Na_2O(SiO_2)_x(H_2O)_y,$$

where $x$ is 0.5 to 5 and $y$ is the number of molecules of water present. The preferred materials are those in which $x$ is 2.9 to 3.9. The inner surfaces of one or both facing sheets may be coated with a layer of intumescent material which may be applied by spraying or painting (which includes using a roller). If desired a reinforcing material may be incorporated in the intumescent layer. Suitable reinforcing materials include inorganic fibres for example, aluminina or zirconia fibres which may be in the form of a loose wool or glass matting for example, chopped roving mat, random mat or continuous strand mat. Where sodium silicate is employed as the intumescent material it is preferable to use a coarse, thick glass mat weighing between 200 and 500 gm/sq.m. In this case the silicate is applied in such amount that the reinforcing material is impregnated with silicate and adheres to the facing sheet by reason of the adhesive nature of the silicate. Alternatively the reinforcing material may be dipped in a bath containing silicate and then applied to the facing sheet. The quantity of silicate applied will depend on the particular silicate used and on the final thickness desired. Where a silicate solution of the formula $Na_2O(SiO_2)_{3.3}(H_2O)_{22}$ is used it has been found that amounts between 1000 and 1500 gm of silicate solution/sq.m give good results.

In another embodiment of the invention there is embedded within the foam core of the laminate a binding material which is preferably not deeper than approximately 1 inch (2.5 cm) from one or both outer surfaces of the foam core. It is particularly advantageous if the binding material is embedded in one or both outer surfaces of the foam core such that it touches one or both inner surfaces of the facing sheets. The binding material may be of any material which improves the coherence of the foam under conditions of high temperature, and is capable of adhering to the isocyanurate based foam as aforesaid. Suitable materials are metal wires, filaments or meshes; glass, textile or plastic fibres, strands, filaments, strips or extrusions in single, random, woven or meshed form. Woven or meshed material must however be of a sufficiently coarse mesh or weave to allow the foam mix to penetrate the interstices. Particularly suitable is wire mesh, for example chicken wire.

The laminates of the invention may be manufactured in any known equipment used for the production of conventional foam laminates, which may be a "horizontal" or "vertical" batch mould, jig or press, or a continuous laminating machine.

In a horizontal batch process, where the faces of the laminate to be produced lie in a horizontal plane, a first facing sheet coated with, for example, a reinforced layer of sodium silicate as hereinbefore described which has been allowed to dry and set, is laid in the bottom of the mould with the silicate-coated side facing upwards. A measured quantity of foam mix is poured or sprayed into the mould and a second facing sheet, optionally with a layer of the same or a different intumescent material applied to it under surface, is either floated on top of the foam mix or supported in a horizontal plane at the top of the mould which is then closed. The quantity of foam mix used is sufficient to give some degree of "overpacking" when fully cured: that is to say that if the foam were allowed to rise freely it would achieve a thickness marginally greater than it does with the mould closed. This overpacking reduces the formation of voids between the second facing sheet and foam core and hence improves adhesion. The sides of the mould are coated with a release agent to facilitate removal of the laminate from the mould. Alternatively edging members, which become part of the finished laminate, may be inserted in the mould before the foam is introduced. These members may be constructed or materials hereinbefore exemplified for the facing sheets and may be of special design, for example, they can be arranged to mate with supporting frames and to provide overlapping or tongue and groove effects. When it is required to produce a laminate having binding material embedded inside the foam it may be convenient to support the binding material in a plane above that of the lower facing sheet by means of brackets, or by attachment to the edging members when these are used. Preferably the binding material is simply laid on top of the lower facing sheet or adhered to it using the intumescent material as an adhesive or any other suitable adhesive. A second layer of binding material may be adhered to the underside of the upper facing sheet or even floated on top of the foam mix.

In a "vertical" batch process it is most convenient to insert into a jig two facing sheets, one or both of which is coated with a layer of intumescent material, spaced apart on three sides by edging members, the fourth side presenting an opening at the top of the mould. Optionally, binding material may be adhered to one or both facing sheets or held in a plane between the facing sheets by attachment to the edging members. The foam mix may be introduced into the mould by any of a number of well known filling techniques, for example by direct pour or by using a reciprocating injection head, and for larger size laminates the foam core may be built up in layers allowing one layer to foam before introducing the next preferably using frothing.

The laminates of the invention may be produced continuously on any conventional continuous laminating machine, but particularly suitable are those machines adapted to accomodate rigid discontinuous facing sheets and edging members for example those described in British Specifications Nos. 1,098,471, 1,164,305 and 1,245,881.

The relative fire resistance of foam laminates may be measured under test conditions similar to those described in the British Standards Institution's "Fire Tests on Building Materials and Structures" (BS 476: Part 8: 1972). Briefly, one face of the laminate is exposed to a radiant gas furnace which can be accurately controlled to follow a standard temperature profile and the cooler outer face is measured at five points — at the centre and at the centre of each quarter — at regular intervals. The laminate is judged to have failed, in terms of its insulation properties, when either a single point reading has risen above 180° C or the means temperature has risen through 140°0 C. In the case of a laminate faced with a non-combustible material the integrity of the foam core can be observed after stripping off the facing sheets.

The laminates of the present invention may be used in all outlets where synthetic foam laminates are currently used but because of their improved fire resistant properties they may also be used in applications, notably in the building industry, for which conventional foam laminates have hitherto been unacceptable due to their poor fire resistant properties. Particularly suitable are laminates which have both facing sheets made of non-combustible material such as for example, sheet metal, asbestos, asbestos cement and plasterboard.

The invention is illustrated but not limited by, the following examples in which parts and percentages are by weight.

EXAMPLE 1

CONTROL EXPERIMENT —LAMINATE WITHOUT SILICATE LAYER OR BINDING MATERIAL (This control experiment does not of itself constitute part of the invention.)

A foam laminate was produced by first constructing a panel assembly comprising a soft wood frame of internal dimensions 16½ × 16½ × 2 and external dimensions 18 × 18 × 2, and two facing sheets of 20 s.w.g. mild steel. A foam mix capable of reacting to form an isocyanurate based rigid foam was prepared by mixing the following ingredients:

an oxypropylated tolylene diamine of hydroxyl value 310 mg KOH/g (20.4 parts);
a polyoxypropylene-polyoxyethylene block copolymer containing approximately 10% of ethylene oxide residous and having a molecular weight of approximately 2000 (4.0 parts);
a siloxane-polyalkylene oxide copolymer (1.0 part);
a blend of potassium acetate, ethylene glycol and water in the ratio 20:20:1 (1.5 parts);
trichlorofluoromethane (28.0 parts) and
a diphenylmethane diisocyanate composition containing approximately 55% of diisocyanato diphenyl methane isomers, the bulk of the remainder of the iocyanate being present as polymethylene polyphenyl polyisocyanates of functionality greater than two, the NCO content being 29.2% (100.0 parts).

The mixture was poured into the panel assembly, preheated to 35°–40° C, which was then placed in a veneer press. The foam mix gave a 15% overpack density of 45 kg/m³ with a dwell time of 5 minutes. The rigid foam laminate was removed and allowed to cure fully for at least 24 hours before its fire resistance was measured.

A small scale fire resistance test was carried out by clamping the laminate to a surface spread of flame gas furnace, the temperature of which was monitored by thermocouples. Five thermocouples were also attached to the cooler outer metal face of the laminate, one being at the centre and the others being at the centre of each quarter of the panel. The temperature of the furnace was raised in accordance with BS 476, Part 8, Section 1.4.2 viz. On temperature profile according to the relationship $T-To = 345 \log_{10}(8t + 1)$, where t is the time of test in minutes; T is the furnace temperature in °C at time t; and To is the initial furnace in °C and lies between 10°–40° C, and the temperature rises on the cooler face were recorded at two minute intervals.

The laminate failed (in terms of its insulation properties) after 34 minutes when a single point reading had risen above 180° C. (According to BS 476 Part 8, a speciment is deemed to have failed when either a single point reading has risen above 180° C or the mean temperature through 140° C.) At this point the test was stopped, the laminate cooled and the integrity of the foam core examined by stripping off the heated facing. Random large deep cracks were present in the foam core.

LAMINATE IN WHICH ONE FACING IS COATED ON ITS INSIDE WITH A COARSE GLASS MAT REINFORCED LAYER OF SODIUM SILICATE

A foam laminate was produced using the same materials and in the same manner as the laminate of the control experiment. One of the mild steel facing sheets was however first coated with a reinforced layer of sodium silicate on its inner face. This was done by placing a coarse glass mat of 390 gm/sq.m on one side of the steel sheet and impregnating it with a commercial "Neutral" grade of sodium silicate solution using a flexible roller. The manufacturers analysis of this grade of sodium silicate solution was: viscosity at 20° C, 850 c.poises; specific gravity at 20° C, 1.42; composition 9.4% $Na_2O$, 29.9% $SiO_2$ and 60.7% $H_2O$; weight ratio of $SiO_2$ to $Na_2O$, 3.2. The amount of sodium silicate solution used was 1120 g/sq.m which dried to a weight of 660 g/sq.m.

After being allowed to fully cure for at least 24 hours the laminate was subjected to the same small scale fire resistance test as the laminate of the control experiment, with the coated face towards the furnace.

The failure time of the laminate as indicated by the mean temperature of the cool face rising through 140° C, was 46 minutes showing an approximately 35% improvement over the control. Examination of the integrity of the foam core showed random large cracks had formed.

EXAMPLE 2

LAMINATE IN WHICH BOTH FACINGS ARE COATED ON THEIR INNER SURFACE WITH A COARSE GLASS MAT REINFORCED LAYER OF SODIUM SILICATE

A foam laminate was produced as in Example 1 except that both steel facing sheets were coated with a glass mat reinforced layer of sodium silicate.

The failure time of the laminate, as indicated by a single point reading rising above 180° C was 45.5 minutes showing an approximately 34% improvement over the control. Examination of the integrity of the foam core showed random large cracks had formed.

EXAMPLE 3

LAMINATE IN WHICH ONE FACING IS COATED ON ITS INSIDE WITH A LAYER OF SODIUM SILICATE REINFORCED WITH INORGANIC FIBRE

A foam laminate was produced as in Example 1 except that the coarse glass mat was replaced by a layer of inorganic alumina wool fibre.

The failure time of the laminate, as indicated by the mean temperature of the cool face rising through 140° C, was 48 minutes showing an approximately 41% improvement over the control. Examination of the integrity of the foam core showed random large cracks had developed.

EXAMPLE 4

LAMINATE WITH REINFORCING LAYER OF SODIUM SILICATE AND ½ MESH BINDING MATERIAL ADHERED TO INNER FACE

A foam laminate was produced as in Example 1 but, in addition to the reinforced layer of sodium silicate, a layer of ½ mesh chicken wire was laid on top of the coated face and adhered to it by applying blobs of silicate at the points where the wire touched the surface.

The failure time of the laminate, as indicated by a single point reading rising above 180° C, was 54 minutes showing an approximately 59% improvement over the control. Examination of the integrity of the foam showed large cracks had developed.

EXAMPLE 5

LAMINATE WITH REINFORCED LAYER OF SODIUM SILICATE AND ½ MESH BINDING MATERIAL EMBEDDED ½ INTO FOAM CORE

A foam laminate was produced as in Example 1 but, in addition to the reinforced layer of sodium silicate, a layer of ½ mesh chicken wire was inserted within the soft wood frame and attached to it, such that it was at a distance of approximately ½ from the plane formed by the outer edges of the frame and nearer to the coated facing sheet.

The failure time of the laminate, as indicated by the mean temperature of the cool face rising through 140° C, was 42 minutes showing an approximately 24% improvement over the control. Examination of the integrity of the foam core showed large cracks had developed but these were arrested at the wire barrier.

EXAMPLE 6

LAMINATE WITH REINFORCED LAYER OF SODIUM SILICATE AND ½ MESH BINDING MATERIAL 1 INTO FOAM CORE

A foam laminate was produced as in Example 5 except that the chicken wire was inserted in the middle of the frame approximately 1 from both planes formed by the outer edges of the frame.

The failure time of the laminate, as indicated by the mean temperature of the cool face rising through 140° C, was 38 minutes showing an approximately 12% improvement over the control. Examination of the integrity of the foam core showed large cracks had developed some of which were arrested at the wire barrier.

EXAMPLE 7

LAMINATE WITH UN-REINFORCED LAYER OF SODIUM SILICATE TO WHICH IS ADHERED ½ MESH BINDING MATERIAL

A foam laminate was produced as in Example 1 except that the coarse glass matting was omitted from the silicate layer and a layer of ½ mesh chicken wire was adhered to the silicate layer before it was allowed to dry.

The failure time of the laminate, as indicated by a single point reading rising above 180° C, was 46 minutes showing an approximately 35% improvement over the control. Examination of the integrity of the foam showed a deep but not wide crack had developed in the centre of the foam core.

What we claim is:

1. A laminated panel comprising a core of rigid isocyanurate-based foam sandwiched between two facing sheets, characterized in that at least one of the facing sheets has an adherent layer of intumescent material applied to its inner surface and in that there is embedded in one or both outer surfaces of the foam core a wire mesh binding material such that it touches one or both inner surfaces of the facing sheets; the whole being bonded together by the foam core into a unitary construction.

2. A laminated panel as claimed in 1 wherein at least one facing sheet is made from a non-combustible material.

3. A laminated panel as claimed in claim 2 wherein the non-combustible material is sheet metal.

4. A laminated panel as claimed in claim 1 wherein the intumescent material is a sodium silicate of the general formula:

$$Na_2O(SiO_2)_x (H_2O)_y$$

wherein $x$ is 0.5 to 5 and $y$ is the number of molecules of water present.

5. A laminated panel as claimed in claim 4 wherein $x$ is 2.9 to 3.9.

6. A laminated panel as claimed in claim 1 wherein a reinforcing material is incorporated in the intumescent material.

7. A laminated panel as claimed in claim 6 wherein the reinforcing material is a coarse, glass mat weighing between 250 and 500 gm/sq.m.

8. A laminated panel as claimed in claim 1 wherein the wire mesh is chicken wire.

* * * * *